US008028898B2

(12) United States Patent
Lapstun et al.

(10) Patent No.: US 8,028,898 B2
(45) Date of Patent: Oct. 4, 2011

(54) DOUBLE CONVERSION CHEQUE-CLEARING PROCESS AND SYSTEM

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 234 days.

(21) Appl. No.: 12/506,215

(22) Filed: Jul. 20, 2009

(65) Prior Publication Data

US 2010/0025461 A1 Feb. 4, 2010

Related U.S. Application Data

(60) Provisional application No. 61/085,897, filed on Aug. 4, 2008.

(51) Int. Cl.
*G06F 17/60* (2006.01)

(52) U.S. Cl. ........................................ 235/379; 235/381

(58) Field of Classification Search .................. 235/379, 235/381
See application file for complete search history.

(56) References Cited

U.S. PATENT DOCUMENTS

| | | | | |
|---|---|---|---|---|
| 4,864,618 | A | 9/1989 | Wright et al. | |
| 5,051,736 | A | 9/1991 | Bennett et al. | |
| 5,477,012 | A | 12/1995 | Sekendur | |
| 5,652,412 | A | 7/1997 | Lazzouni et al. | |
| 5,661,506 | A | 8/1997 | Lazzouni et al. | |
| 5,692,073 | A | 11/1997 | Cass | |
| 5,852,434 | A | 12/1998 | Sekendur | |
| 6,076,734 | A | 6/2000 | Dougherty et al. | |
| 6,964,374 | B1 | 11/2005 | Djuknic et al. | |
| 7,850,077 | B2 * | 12/2010 | Talwerdi et al. | 235/382 |
| 2003/0023557 | A1 * | 1/2003 | Moore | 705/50 |
| 2009/0261158 | A1 * | 10/2009 | Lawson | 235/379 |
| 2010/0258629 | A1 * | 10/2010 | Huang | 235/449 |

FOREIGN PATENT DOCUMENTS

| | | | |
|---|---|---|---|
| GB | 2306669 A | 5/1997 | |
| JP | 2005-025488 | 1/2005 | |
| WO | WO 99/18487 A2 | 4/1999 | |
| WO | WO 99/50787 A1 | 10/1999 | |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

*Primary Examiner* — Allyson Trail

(57) ABSTRACT

A cheque clearing process includes the steps of: receiving, in a computer system, first payment information based on digital ink generated by an optically imaging pen, the digital ink identifying a unique cheque identity and representing hand-written information entered on the cheque by the pen; receiving, in the computer system, second payment information based on independently reading visible information on the cheque; and comparing the first payment information with the second payment information.

19 Claims, 8 Drawing Sheets

DOUBLE CONVERSION CHEQUE-CLEARING PROCESS AND SYSTEM

FIELD OF INVENTION

The present invention relates generally to a cheque-clearing process and, more particularly, to a method and system for minimizing cheque conversion errors and fraudulent handling of cheques.

CROSS REFERENCES

Various methods, systems and apparatus relating to the present invention are disclosed in the following U.S. patents/patent applications filed by the applicant or assignee of the present invention:

| | | | |
|---|---|---|---|
| 6,982,798 | 7,148,345 | 7,406,445 | 6,832,717 |
| 6,870,966 | 2005/0024510 | 2006/0028459 | 2007/0040817 |
| 12/477,863 | 6,808,330 | 2008/0193007 | 2008/0193044 |
| 12/178,619 | 2007/0130117 | 2008/0097823 | 2008/0192234 |
| 2008/0273010 | 2008/0191024 | 2009/0080691 | |

The disclosures of these applications and patents are incorporated herein by reference.

BACKGROUND

Cheque clearance is a highly distributed and automated process, and it is currently difficult for the paying bank to systematically detect conversion errors or fraud. It is largely up to the account holder to detect mistakes reflected in their statement, and many account holders do not have the time or the inclination to verify their statements. An incorrect cheque value can result from a transcription error during conversion, a failure of intelligent character recognition (ICR) during conversion, or from fraudulent alteration of the cheque details by the payee.

It would be desirable to improve cheque clearance processes so as to minimize conversion errors and fraud.

SUMMARY OF INVENTION

In a first aspect, there is provided a cheque clearing process comprising the steps of:

- receiving, in a computer system, first payment information based on digital ink generated by an optically imaging pen, the digital ink identifying a unique cheque identity and representing handwritten information entered on the cheque by the pen;
- receiving, in the computer system, second payment information based on independently reading at least visible information on the cheque; and
- comparing at least part of the first payment information with at least part of the second payment information.

The cheque-clearing process of the present invention advantageously assists in minimizing fraud (e.g. by the payee altering a cheque) or cheque-conversion errors (e.g. by misreading the cheque at the payee's bank) by converting the cheque twice. The first conversion is based on digital ink generated by the payer's pen; the second conversion is based on scanning the cheque and reading the visible information using, for example, intelligent character recognition. The second cheque conversion is performed independently of the first cheque conversion, which enables the detection of fraud or any conversion errors during the clearing process by comparing payment information generated from each independent cheque conversion.

Optionally, the first or second payment information is selected from at least one of: an account number, a cheque number, a bank code, a branch code, an account name holder, a cheque value, a date, and a payee name.

Optionally, the unique cheque identity identifies at least one of: an account number, a cheque number, a bank code, a branch code and an account name holder.

Optionally, the cheque has a coding pattern printed thereon, the coding pattern identifying the unique cheque identity.

Optionally, the coding pattern is a position-coding pattern encoding a plurality of locations on the cheque, the position-coding pattern being imagable by the pen thereby enabling the pen to generate the digital ink.

Optionally, a computer system causes a paying bank to credit a payee bank for a value of the cheque if the first payment information matches the second payment information.

Optionally, a paying bank flags an exception if the first payment information does not match the second payment information.

Optionally, a payment request identified by the cheque is refused if the paying bank flags an exception.

Optionally, the digital ink comprises a unique pen identity for the optically imaging pen and the unique pen identity is associated with an account name holder authorized to write the cheque.

Optionally, at least part of the first payment information is generated from the digital ink using intelligent character recognition.

Optionally, at least part of the second payment information is generated from a scanned image of the cheque using intelligent character recognition.

Optionally, part of the second payment information is identified using magnetic ink character recognition (MICR) data printed on the cheque.

Optionally, the part of the second payment information is selected from at least one of: account number, cheque number, bank code and branch code.

Optionally, the computer system is owned or associated with any one of: a paying bank, a payee bank or an independent clearing house.

Optionally, the process enables detection of fraudulent handling of the cheque by comparing the first payment information with the second payment information.

Optionally, the process detects errors in converting payment information entered on the cheque by comparing the first payment information with the second payment information.

In a second aspect, there is provided a computer system for clearing cheques, the computer system being configured for:

- receiving first payment information based on digital ink generated by an optically imaging pen, the digital ink identifying a unique cheque identity and representing handwritten information entered on the cheque by the pen;
- receiving second payment information based on reading visible information on the cheque; and
- comparing at least part of the first payment information with at least part of the second payment information.

In a third aspect, there is provided a system for writing a cheque which enables detection of fraudulent handling of the cheque during a clearing process, the system comprising:

a cheque printed with a position-coding pattern, the position-coding pattern encoding a plurality of locations on the cheque and identifying a unique cheque identity;

an optically imaging pen comprising:

a marking nib for entering handwritten information on the cheque writing;

an image sensor for imaging the position-coding pattern during entering of the handwritten information;

a processor for generating digital ink using the imaged position-coding pattern, the digital ink representing the handwritten information and the unique cheque identity; and means for communicating the digital ink to a computer system, thereby enabling the computer system to generate first payment information based on the digital ink and compare the first payment information with second payment information during the clearing process, the second payment information being based on independently reading at least visible information on the cheque.

Optionally, the computer system comprises a first computer system for interpreting the digital ink and generating the first payment information, and a second computer system for comparing the first payment information with the second payment information, the first computer system being in communication with the second computer system.

BRIEF DESCRIPTION OF DRAWINGS

Preferred and other embodiments of the invention will now be described, by way of non-limiting example only, with reference to the accompanying drawings, in which.

1 NETPAGE SYSTEM OVERVIEW

1.1 Netpage System Architecture

The present invention is used in connection with the Applicant's netpage system, which has been described in detail in the cross-referenced patent applications identified above.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device ("reader") and transmitted to the netpage system. The sensing device may take the form of, for example, a clicker (for clicking on a specific position on a surface), a pointer having a stylus (for pointing or gesturing on a surface using pointer strokes), or a pen having a marking nib (for marking a surface with ink when pointing, gesturing or writing on the surface). In the context of the present invention, the sensing device typically takes the form of a pen having a marking nib for writing on cheques.

In one embodiment of the netpage system, active buttons and hyperlinks on each page can be clicked with the sensing device to request information from the network or to signal preferences to a network server. In other embodiments of the netpage system, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments of the netpage system, text on a netpage may be clicked or gestured to initiate a search based on keywords indicated by the user.

Figure 1:
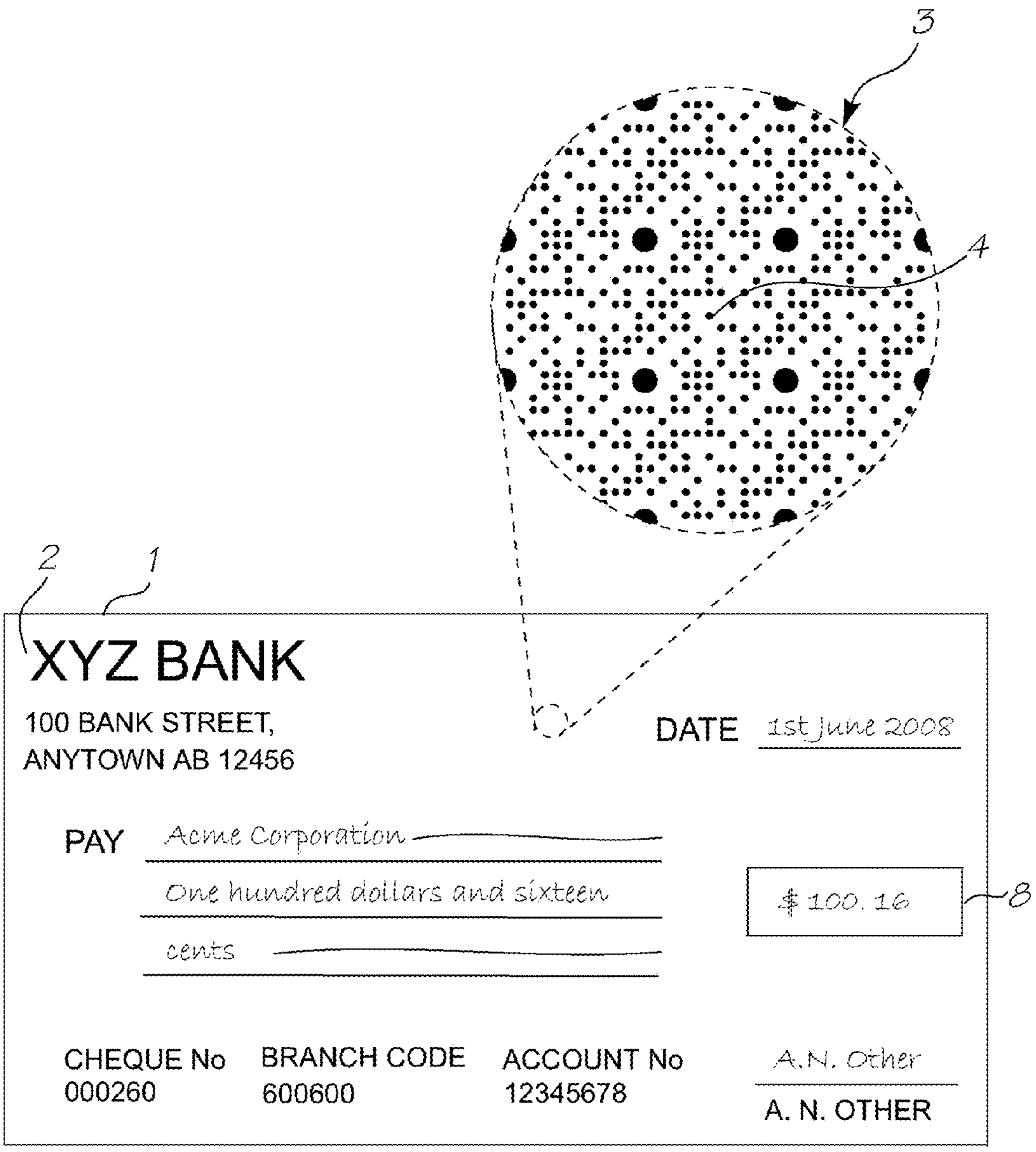
FIG. 1 shows a Netpage cheque according to the present invention.

As illustrated in FIG. 1, a printed netpage in the present invention takes the form of a netpage cheque 1. The netpage cheque 1 represents an interactive form which can be filled in by the user both physically, on the printed page, and "electronically", via communication between the pen and the netpage system. The netpage cheque 1 comprises the usual cheque input fields, such as a date, payee, amount, signature etc. The netpage cheque 1 consists of a graphic impression 2, printed using visible ink, and a surface coding pattern 3 superimposed with the graphic impression. The coding pattern 3 is typically printed with an infrared ink and the superimposed graphic impression 2 is printed with colored ink(s) having a complementary infrared window, allowing infrared imaging of the coding pattern 3. The coding pattern 3 is usually invisible or nearly invisible to the unaided human eye. Suitable inks for printing the coding pattern are described in, for example, the Applicant's U.S. Pat. No. 7,148,345, the contents of which are herein incorporated by reference.

The surface coding pattern 3 comprises a plurality of tags 4, which are densely tiled over the whole netpage 1. Characteristics of the tags are described in more detail in Section 2.

Figure 2:
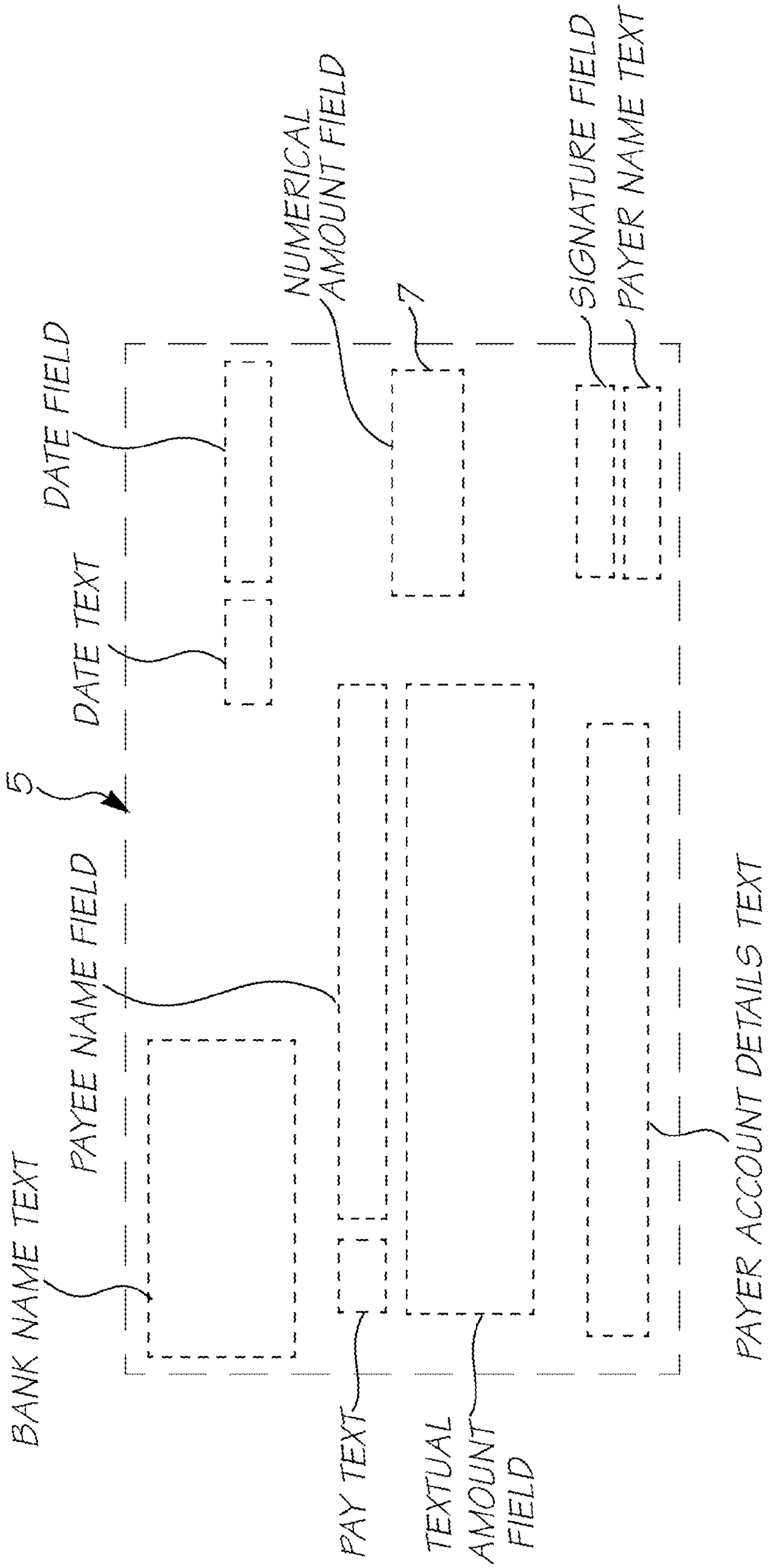
FIG. 2 shows a page description corresponding to the Netpage cheque shown in FIG. 1.

Referring to FIG. 2, a corresponding page description 5, stored on the netpage network, describes the individual elements of the netpage cheque 1. In particular it has an input description describing the type and spatial extent (zone) of each interactive element (i.e. cheque input field), to allow the netpage system to correctly interpret input via the netpage cheque 1. The "Numerical Amount Field", for example, has a zone 7 which corresponds to the spatial extent of the corresponding input field 8 on the netpage cheque 1.

Figure 3:
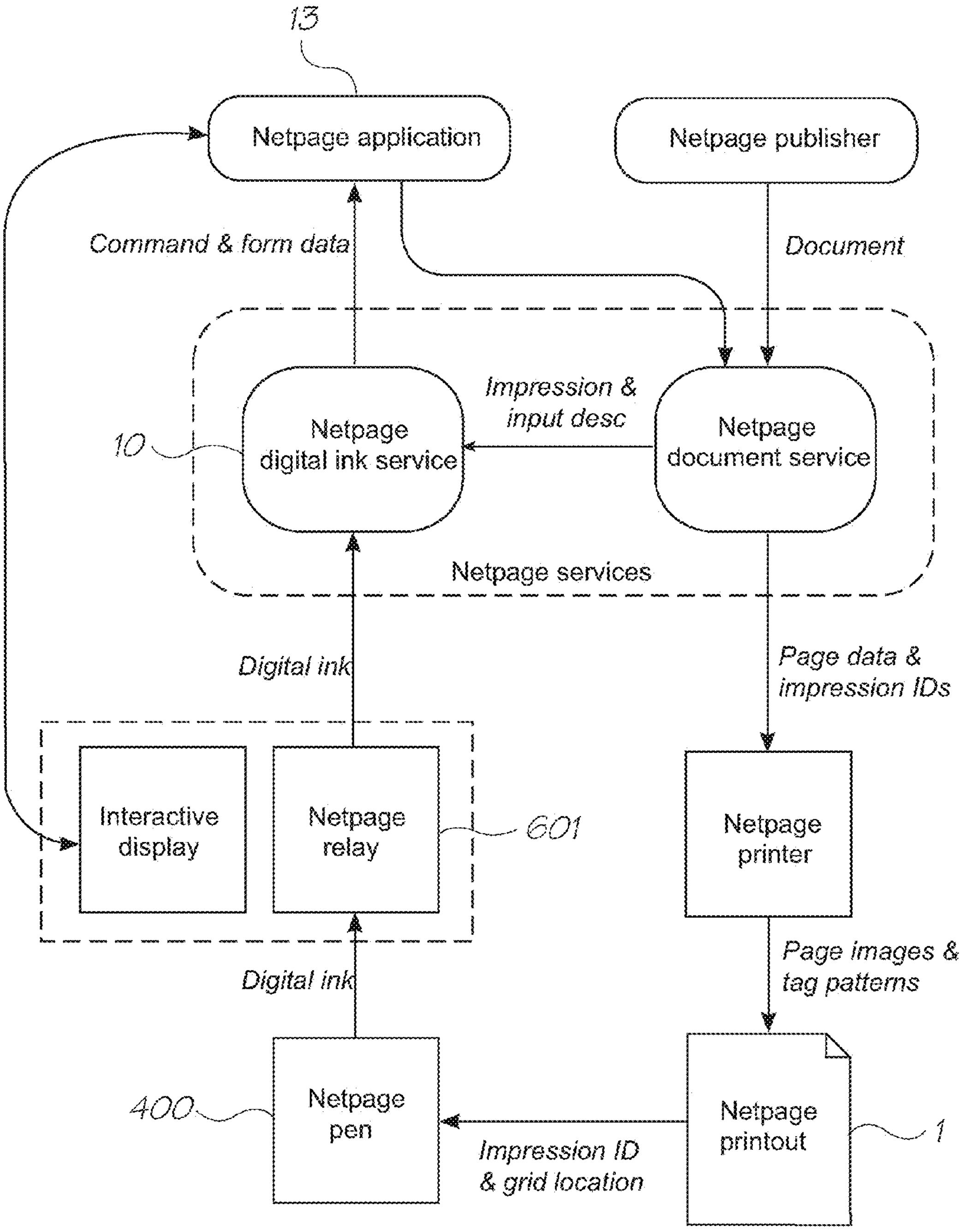
FIG. 3 shows schematically data flow between Netpage devices and Netpage services.

Referring to FIG. 3, netpages may be printed via a Netpage document service, which accepts a document from a Netpage publisher or other Netpage application, and produces a printout via a Netpage printer. The Netpage printer may use a document identity to render the Netpage coding pattern 3 on demand using a tag encoder in the printer (as described in, for example, U.S. Pat. No. 6,982,798, the contents of which are incorporated herein by reference). Alternatively, netpages may be printed by traditional analog printing presses, using such techniques as offset lithography, flexography, screen printing, relief printing and rotogravure. It is also possible for a user to request an individual netpage cheque 1 via, for example, a secure bank website and receive an image file (e.g. pdf file) corresponding to the requested netpage cheque via the internet. The image file contains the Netpage coding pattern 3 and may be printed on any conventional printer having sufficient dot resolution. Other methods for printing netpage cheques 1 will be readily apparent to the person skilled in the art.

Each tag 4 of the coding pattern 3 encodes the two-dimensional coordinates of its location on the graphic impression 2 as well as the impression's unique identifier (more specifically, a document ID, page ID or a cheque ID). When a tag is optically imaged by a Netpage pen 400, the pen is able to identify the corresponding impression identity as well as its own position relative to the impression. When the user of the pen 400 moves the pen relative to the coordinate grid encoded by the coding pattern 3, the pen generates a stream of positions. This stream is referred to as digital ink. A digital ink stream also records when the pen makes contact with a surface and when it loses contact with a surface, and each pair of these so called pen-down and pen-up events delineates a stroke drawn by the user using the pen. Any interaction with the coding pattern 3, which yields the impression identity and at least one position may be referred to as "interaction data".

The document (e.g. netpage cheque 1) has a corresponding input description which defines commands which may be activated by the user as well as form fields which may be filled in by the user. Both commands and form fields have active zones, i.e. areas of the page where they capture user input.

When the Netpage pen is used to fill in a form (e.g. the netpage cheque 1), it generates digital ink identifying the impression identifier (e.g. a cheque identity) and a stream of positions. The Netpage digital ink service accepts digital ink from a Netpage pen. Since the pen typically only has a short-range communications capability, it forwards the digital ink to the Netpage digital ink service via a Netpage relay 601 which has a longer-range communications capability. Typical relays include mobile phones, PDAs and personal computers.

The digital ink service uses the impression identifier (e.g. cheque identity) in the digital ink to retrieve the corresponding impression and input description from the document service, and attempts to assign each individual digital ink stroke to a field of the input description. Once it detects that the user of the pen has designated a form submission command, it interprets the digital ink assigned to the form and submits the resultant form data to the application 13 associated with the command.

In order to allow the digital ink service 10 to interpret pen input in relation to a particular impression, the document service keeps a copy of every input description it prints.

In order to allow a user to fill in a form over an arbitrarily long time, the digital ink service 10 retains a copy of all digital ink it receives, at least until the digital ink is interpreted and submitted to an application. The digital ink service 10 optionally retains all digital ink indefinitely, to allow digital ink searching of both form content and document annotations.

The Netpage pen 400 may be incorporated directly into a hand-held device such as a mobile phone or PDA. Conversely, the pen may incorporate a long-range communications capability and not need a separate relay.

Since the relay device 601 typically incorporates an interactive display, the digital ink service 10 may identify the interactive display to a target application to allow the application to communicate directly with the interactive display, thus allowing an interaction initiated via paper and pen to lead to a richer screen-based interaction, and generally allowing the development of hybrid paper- and screen-based applications which make the most of both media (see, for example, the Applicant's US Publication No. US 2008/0097823, the contents of which are incorporated herein by reference).

In the presence of multiple distributed digital ink services a pen 400 (or its relay 601) may use a name service to resolve the network address of a target digital ink service, based on pen identifier and possibly impression identifier. In the presence of multiple distributed document services, a digital ink service uses a name service to resolve the network address of a document service, based on impression identifier.

2 NETPAGE TAGS

Each tag 4, contained in the position-coding pattern 3, identifies an absolute location of that tag within a region of a substrate.

Each interaction with a netpage should also provide an impression identity together with the tag location (which is typically a grid location). In a preferred embodiment, the region or impression to which a tag refers coincides with an entire page, and the impression identity is therefore synonymous with the page ID of the page on which the tag appears. In other embodiments, the region or impression to which a tag refers can be an arbitrary subregion of a page or other surface. For example, it can coincide with the zone of an interactive element, in which case the region ID can directly identify the interactive element.

As described in some of the Applicant's previous applications (e.g. U.S. Pat. No. 6,832,717), the region identity may be encoded discretely in each tag 4. As described other of the Applicant's applications (e.g. U.S. application Ser. Nos. 12/025,746 & 12/025,765 filed on Feb. 5, 2008), the region identity may be encoded by a plurality of contiguous tags in such a way that every interaction with the substrate still identifies the region identity, even if a whole tag is not in the field of view of the sensing device.

Each tag 4 should preferably identify an orientation of the tag relative to the substrate on which the tag is printed. Strictly speaking, each tag 4 identifies an orientation of tag data relative to a grid containing the tag data. However, since the grid is typically oriented in alignment with the substrate, then orientation data read from a tag enables the rotation (yaw) of the netpage pen 400 relative to the grid, and thereby the substrate, to be determined.

A tag 4 may also encode one or more flags which relate to the region as a whole or to an individual tag. One or more flag bits may, for example, signal a netpage pen 400 to provide feedback indicative of a function associated with the immediate area of the tag, without the reader having to refer to a corresponding page description 5 for the impression. A netpage pen may, for example, illuminate an "active area" LED when positioned in the zone of an input field, such as the cheque input fields shown in FIG. 1.

A tag 4 may also encode a digital signature or a fragment thereof. Tags encoding digital signatures (or a part thereof) are useful in applications where it is required to verify a product's authenticity. Such applications are described in, for example, US Publication No. 2007/0108285, the contents of which are herein incorporated by reference. The digital signature may be encoded in such a way that it can be retrieved from every interaction with the substrate. Alternatively, the digital signature may be encoded in such a way that it can be assembled from a random or partial scan of the substrate.

It will, of course, be appreciated that other types of information (e.g. tag size etc) may also be encoded into each tag or a plurality of tags.

For a full description of netpage tags 4, reference is made to the Applicant's previously filed patent applications identified above, the contents of which are herein incorporated by reference (see, for example, U.S. Pat. No. 6,832,717 and U.S. application Ser. Nos. 12/025,746 & 12/025,765 filed on Feb. 5, 2008, the contents of which are herein incorporated by reference).

3 OBJECT MODEL

Figure 4:
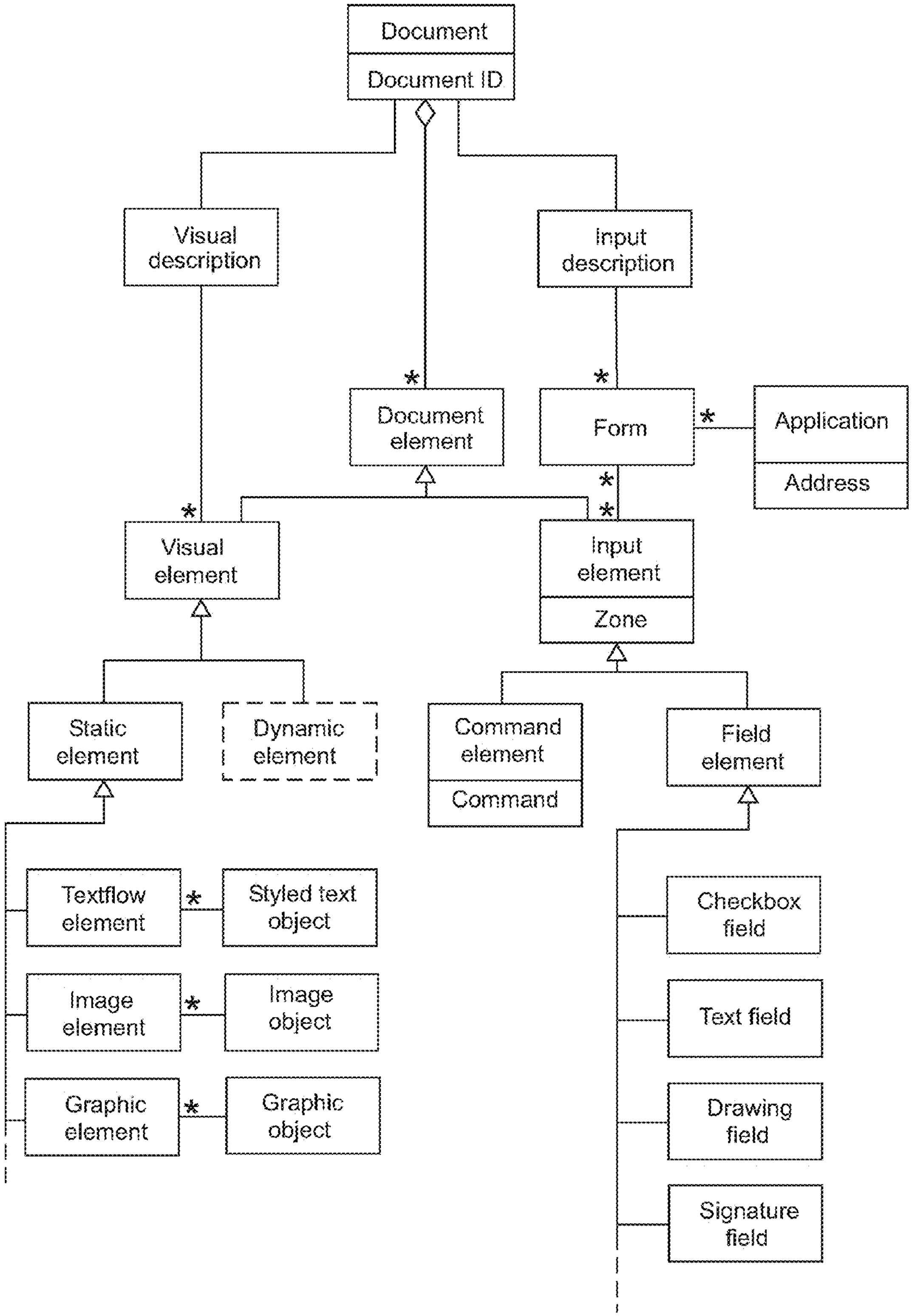
FIG. 4 is a class diagram for a generic Netpage document.

As illustrated in the class diagram in FIG. 4, each document handled by the Netpage service is described by a visual description and an input description, which together define the page description for a page or document. Each document is uniquely identified via its document ID or impression identifier, which is typically a cheque ID in the case of a netpage cheque. The document ID is identified by digital ink received by the Netpage service, thereby enabling the Netpage service to retrieve the corresponding input description for that document ID and interpret the digital ink accordingly.

The visual description consists of a collection of visual elements representing static and/or dynamic elements. Static elements represent textflows, images, graphics etc. In the case of the netpage cheque 1, the visual description comprises a description of the various text zones shown in FIG. 2, such as "Bank Name Text", "Date Text", "Payer Name Text" etc.

Dynamic elements have associated dynamic objects and related applications. Examples of dynamic objects and their related applications include an audio clip and audio player, a video clip and video player, a photo and photo viewer etc. However, netpage cheques usually only contain static elements.

The input description consists of a collection of forms, each of which consists of a collection of input elements representing commands and/or fields. Forms may overlap both physically and logically, and the same input element may participate in multiple forms. Each input element has a zone which defines the area within which it captures input. In the case of the netpage cheque 1, the input description comprises a description of the various input field zones shown in FIG. 2, such as "Date Field", "Payee Name Field", "Signature Field" etc.

Each form is associated with a target application. The application receives submissions of the form, and the application is identified by an address.

4 NETPAGE INTERACTION

As shown in FIG. 3, the netpage relay 601 receives digital ink relating to a stroke from the Netpage pen 400 when the pen is used to interact with a netpage 1. The coding pattern 3 is read by the pen using its 2D image sensor when it is used to interact with the netpage 1, such as during handwritten input into one of the cheque input fields. The imaged coding pattern allows the document identity (e.g. cheque ID) to be determined and an indication of the positioning of the pen relative to the page to be obtained.

When the Netpage digital ink service 10 receives the digital ink from the pen 400, it retrieves the corresponding page description 5 using the document ID, and interprets the digital ink using the relevant input description. Each individual digital ink stroke is assigned to an input element (e.g. input field) of the input description according to the position and extent of the stroke and the zone of the input element. Digital ink comprises a set of timestamped strokes, and each stroke comprises a set of timestamped pen positions. Pen strokes may comprise other data, such as pen orientation, nib force and/or pen ID.

Once the digital ink service 10 detects that the user of the pen has designated a form submission command, it interprets the digital ink assigned to each field according to field type and submits resultant form data to the Netpage application 13 associated with the command (see FIG. 3). In the present invention, the data submitted to the Netpage application 13 typically represents cheque payment information, and the Netpage application may be handled by, for example, a paying bank, a payee bank or an independent clearing house.

Any digital ink captured in the zone of a text field is automatically converted into a string of text characters using intelligent character recognition.

Any digital ink captured in the zone of a signature field zone is automatically verified by comparing the handwritten signature with a recorded signature of the user of the pen. The recorded signature is retrieved via the pen ID contained in the digital ink. If the signatures match, then the Netpage digital ink service 10 digitally signs the form data on behalf of the user.

5 THE NETPAGE PEN

Figure 5:
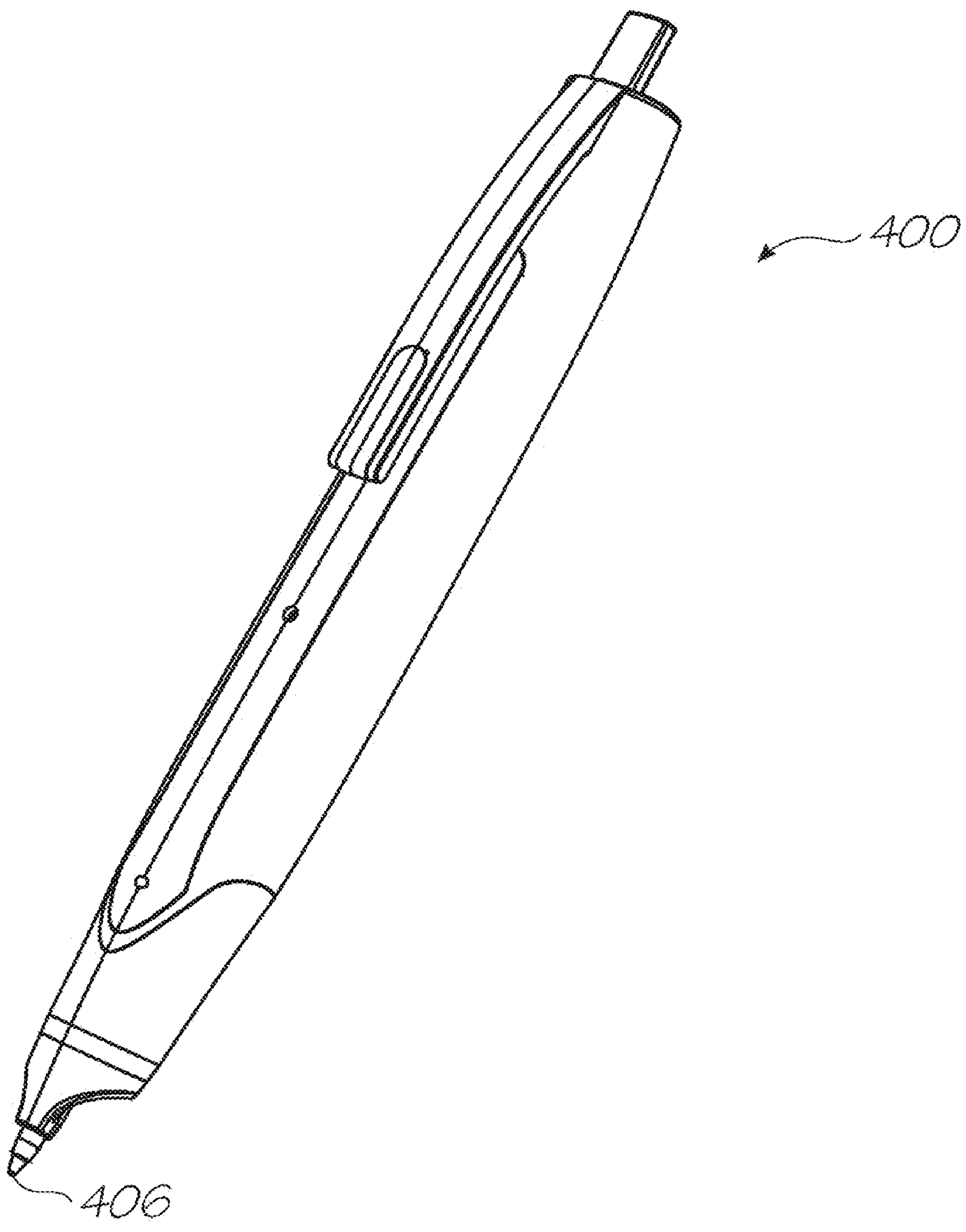
FIG. 5 is a perspective view of a Netpage pen.
Figure 6:
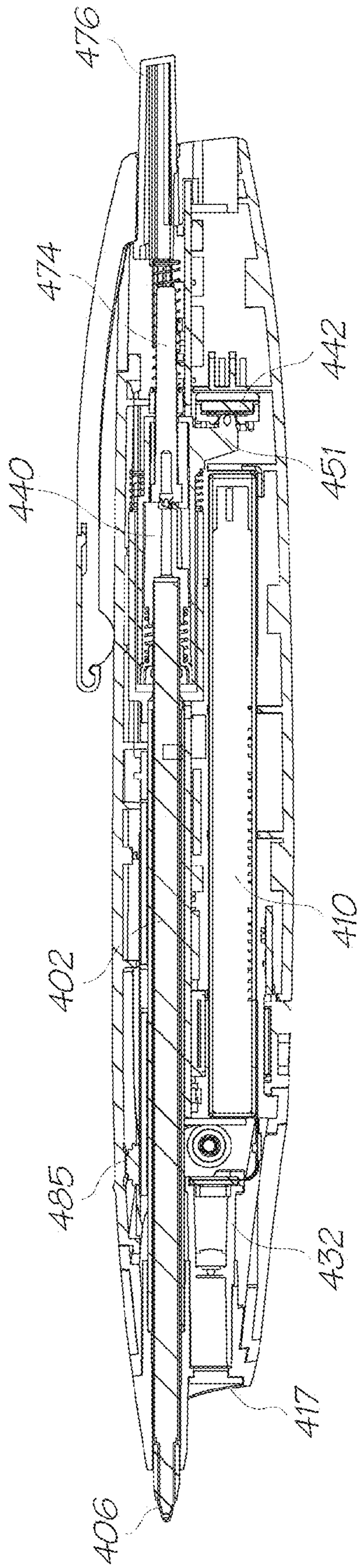
FIG. 6 is a longitudinal section of the Netpage pen showing various internal components.

Referring to FIGS. 5 and 6, the Netpage pen 400 is a motion-sensing writing instrument which works in conjunction with a tagged Netpage surface (see Section 2). The Netpage pen 400 typically includes a conventional ballpoint pen cartridge 402 having a nib 406 for marking the surface, an image sensor 432 and processor for capturing the absolute path of the pen on the surface and identifying the surface, a force sensor 442 for simultaneously measuring the force exerted on the nib 406, an optional Gesture button 485 for indicating that a Gesture is being captured, and a real-time clock for simultaneously measuring the passage of time.

During normal operation, the Netpage pen 400 regularly samples the encoding of a surface as it is traversed by the pen's nib 406. The sampled surface encoding is decoded by the Netpage pen to yield surface information comprising the identity of the surface, the absolute position of the nib of the Netpage pen on the surface, and the pose of the Netpage pen relative to the surface. The Netpage pen also incorporates a force sensor 442 that produces a signal representative of the force exerted by the nib on the surface. The force sensor senses nib forces via a pin 451, which is coupled to the pen cartridge when the cartridge is extended as shown in FIG. 6.

Each stroke is delimited by a pen down and a pen up event, as detected by the force sensor. Digital Ink is produced by the Netpage pen as the timestamped combination of the surface information signal, force signal, and the Gesture button input. The digital ink thus generated represents a user's interaction with a surface—this interaction may then be used to perform corresponding interactions with applications that have predefined associations with portions of specific surfaces. (In general, any data resulting from an interaction with a Netpage surface coding is referred to herein as "interaction data").

Digital ink is ultimately transmitted to the Netpage digital ink service 10, but until this is possible it may be stored within the Netpage pen's internal non-volatile memory. Once received by a Netpage digital ink service 10, the digital ink may be subsequently rendered in order to reproduce user markup of surfaces such as annotations or notes, or to perform handwriting recognition. A category of digital ink known as a Gesture also exists that represents a set of command interactions with a surface. (Although the Netpage digital ink service 10 is typically remote from the pen 400 as described herein, it will be appreciated that the pen may have an onboard computer system for interpreting digital ink).

The pen 400 incorporates a Bluetooth radio transceiver for transmitting digital ink to the digital ink service, usually via a relay device 601 (see FIG. 3). When operating offline, the pen buffers captured digital ink in non-volatile memory. When operating online the pen transmits digital ink in real time as soon as all previously buffered digital ink has been transmitted.

Figure 7:
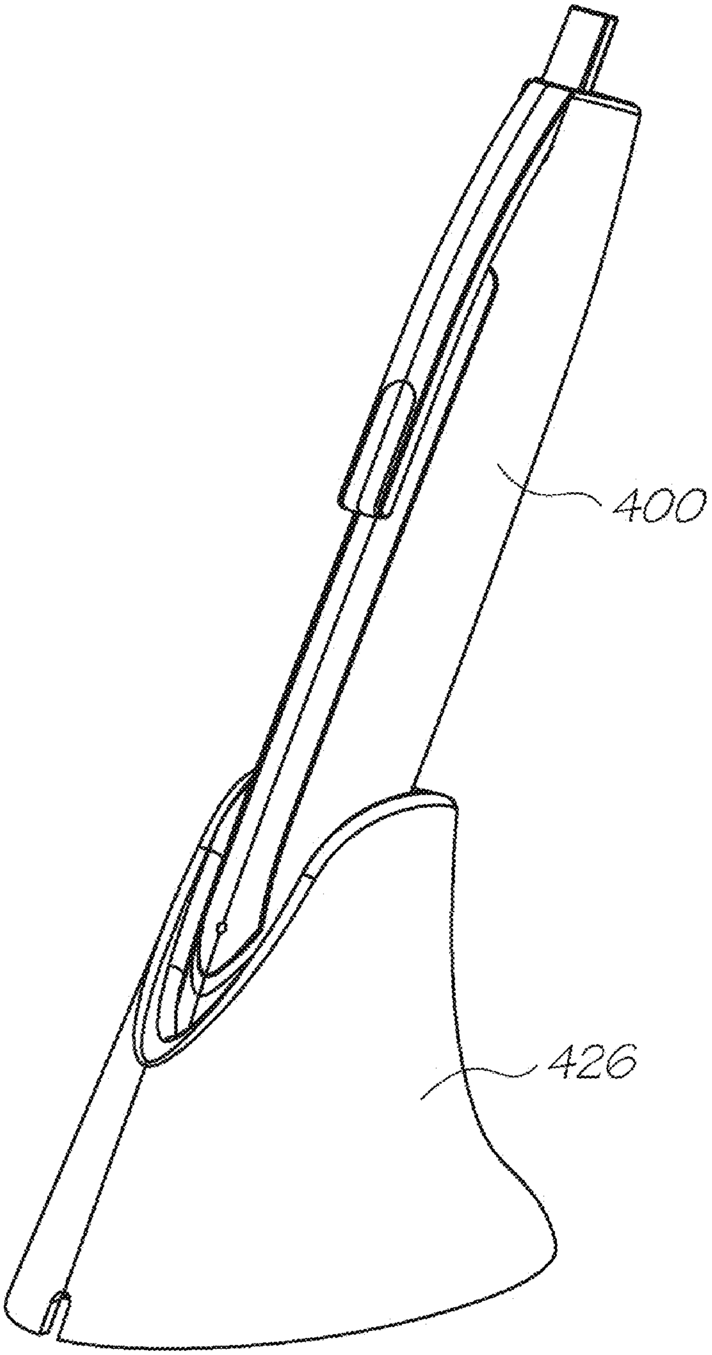
FIG. 7 shows the Netpage pen docked in a charging cradle.

The Netpage pen is supplied with a charging cradle 426 referred to as a Netpage pen cradle (see FIG. 7). The Netpage pen cradle 426 contains a Bluetooth to USB relay and connects via a USB cable to a computer which provides communications support for local applications and access to Netpage services.

The Netpage pen is powered by a rechargeable battery 410. The battery is not accessible to or replaceable by the user. Power to charge the Netpage pen is usually sourced from the Netpage pen cradle 426, which in turn can source power either from a USB connection, or from an external AC adapter.

The Netpage pen's nib 406 may be user retractable, which serves the dual purpose of protecting surfaces and clothing from inadvertent marking when the nib is retracted, and signalling the Netpage pen to enter or leave a power-saving state when the nib is correspondingly retracted or extended. Referring to FIG. 6, the retraction mechanism 440 is actuated by a retraction button 476, which is couple to the pen cartridge via a plunger 474.

Various embodiments of the Netpage pen 400 are described in greater detail in the Applicant's U.S. Pat. No. 6,870,966; U.S. Pat. No. 6,808,330; US Publication No. 2005/0024510; US Publication No. 2006/0028459; US Publication No. 2007/0040817; and U.S. application Ser. No. 12/477,863 filed on Jun. 3, 2009, the contents of each of which are herein incorporated by reference.

6 NETPAGE DOUBLE CONVERSION CHEQUE CLEARANCE

The netpage cheque 1 shown in FIG. 1 is printed with the Netpage tag pattern 3 to allow information written on the cheque with the Netpage pen 400 by the account holder to be captured as digital ink and transmitted to the paying bank, optionally via the Netpage digital ink service 10. This allows the paying bank to convert the cheque independently of the payment request information presented when the cheque subsequently passes through the clearing process after it is deposited by the payee. The Netpage cheque 1 is a type of Netpage form, which receives handwritten input in various input fields.

Conversion of the cheque based on the digital ink is relatively easy. The digital ink identifies the cheque and hence the account details and cheque number. The digital ink also encodes the cheque value in the form of handwriting, allowing it to be converted by a human or ICR.

When the cheque is converted twice, i.e. by the paying bank based on the digital ink and by the clearing process based on the physical cheque, it becomes easy for the paying bank to detect errors of fraud. Any mismatch between the information obtained from the two conversions is indicative of an error or fraud. It doesn't matter which conversion is in error; when a mismatch is detected a human can cross-check the two conversions.

If an account holder commits to using a Netpage pen then the paying bank can flag an exception if it receives a payment request for an unused cheque, i.e. a cheque for which it has received no digital ink. However, electronic cheque conversion is increasingly being performed at point of sale, so there is an increasing likelihood that the paying bank will receive a payment request for a cheque before the customer's pen has had a chance to upload its digital ink. This does not matter from a verification standpoint. The paying bank can still flag an exception if there's a subsequent mismatch, and institute recovery.

Figure 8:
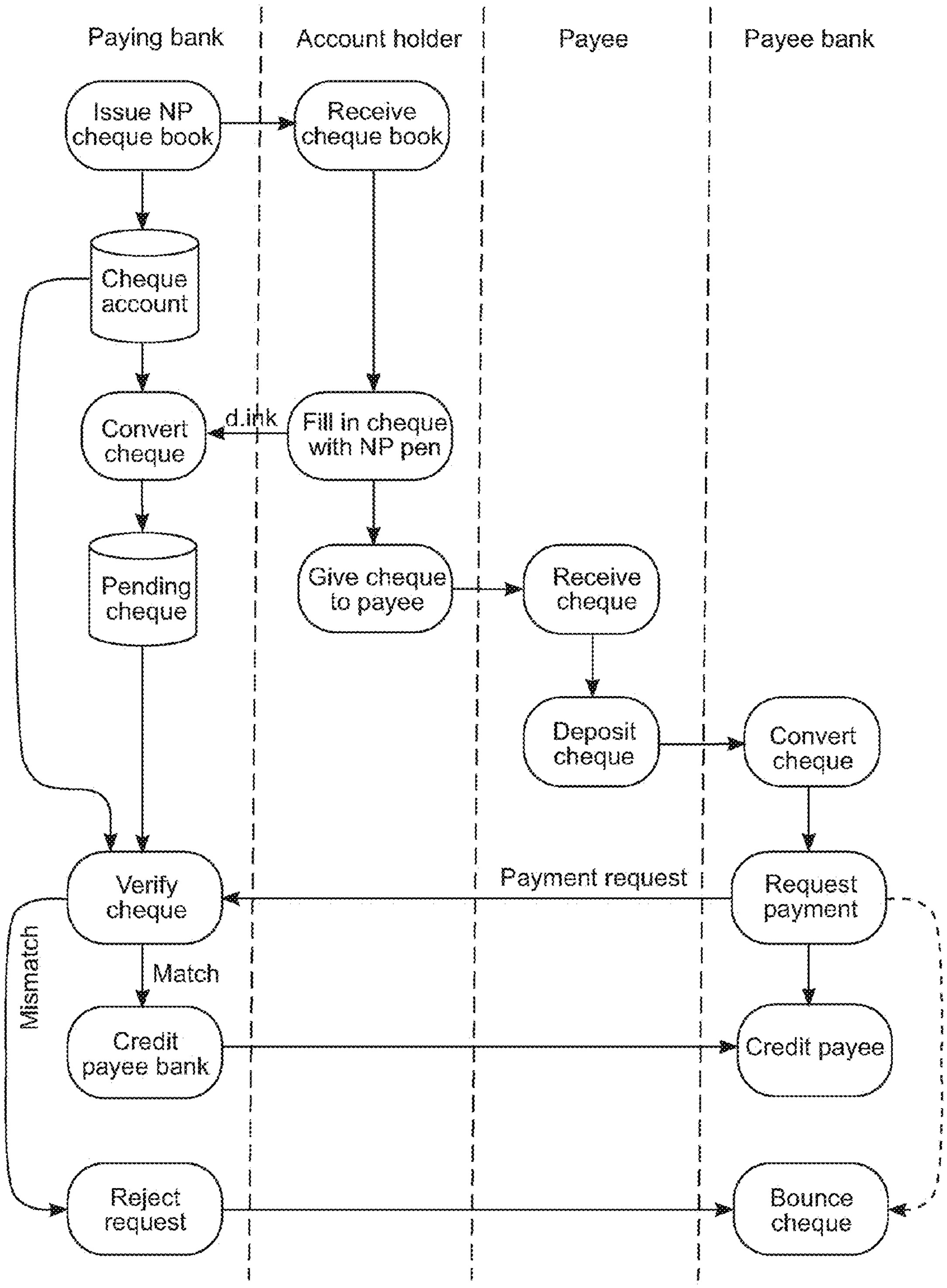
FIG. 8 is a simplified flow diagram for a double conversion cheque clearance process.

FIG. 8 shows a simplified flow for a double conversion cheque clearance process. As described above, the process differs from a normal (single conversion) cheque clearance process in that the paying bank independently converts the cheque based on the digital ink received from the account holder's Netpage pen and compares the resulting payment information with the payment information presented by the payee bank during the clearance process.

The simplified process in FIG. 8 shows the payee bank converting and clearing the cheque. It will, of course, be appreciated that this may involve a number of intermediaries in practice.

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A cheque clearing process comprising the steps of:

receiving, in a computer system, first payment information based on digital ink generated by an optically imaging pen, said digital ink identifying a unique cheque identity and representing handwritten information entered on said cheque by said pen;

receiving, in said computer system, second payment information based on independently reading at least visible information on said cheque; and comparing at least part of the first payment information with at least part of the second payment information.

2. The process of claim 1, wherein the first or second payment information is selected from at least one of: an account number, a cheque number, a bank code, a branch code, an account name holder, a cheque value, a date, and a payee name.

3. The process of claim 1, wherein said unique cheque identity identifies at least one of: an account number, a cheque number, a bank code, a branch code and an account name holder.

4. The process of claim 1, wherein said cheque has a coding pattern printed thereon, said coding pattern identifying the unique cheque identity.

5. The process of claim 4, wherein said coding pattern is a position-coding pattern encoding a plurality of locations on said cheque, said position-coding pattern being imagable by said pen thereby enabling the pen to generate said digital ink.

6. The process of claim 1, wherein a computer system causes a paying bank to credit a payee bank for a value of the cheque if the first payment information matches the second payment information.

7. The process of claim 1, wherein a paying bank flags an exception if the first payment information does not match the second payment information.

8. The process of claim 1, wherein a payment request identified by the cheque is refused if the paying bank flags an exception.

9. The process of claim 1, wherein said digital ink comprises a unique pen identity for said optically imaging pen and said unique pen identity is associated with an account name holder authorized to write said cheque.

10. The process of claim 1, wherein at least part of said first payment information is generated from said digital ink using intelligent character recognition.

11. The process of claim 1, wherein at least part of said second payment information is generated from a scanned image of said cheque using intelligent character recognition.

12. The process of claim 1, wherein part of said second payment information is identified using magnetic ink character recognition (MICR) data printed on said cheque.

13. The process of claim 12, wherein said part of said second payment information is selected from at least one of: account number, cheque number, bank code and branch code.

14. The process of claim 1, wherein said computer system is owned or associated with any one of: a paying bank, a payee bank or an independent clearing house.

15. The process of claim 1, wherein said process enables detection of fraudulent handling of said cheque by comparing the first payment information with the second payment information.

16. The process of claim 1, wherein said process detects errors in converting payment information entered on said cheque by comparing the first payment information with the second payment information.

17. A computer system for clearing cheques, said computer system being configured for:

receiving first payment information based on digital ink generated by an optically imaging pen, said digital ink identifying a unique cheque identity and representing handwritten information entered on said cheque by said pen;

receiving second payment information based on reading visible information on said cheque; and comparing at least part of the first payment information with at least part of the second payment information.

18. A system for writing a cheque which enables detection of fraudulent handling of said cheque during a clearing process, said system comprising:

a cheque printed with a position-coding pattern, said position-coding pattern encoding a plurality of locations on said cheque and identifying a unique cheque identity;

an optically imaging pen comprising:

a marking nib for entering handwritten information on said cheque writing;

an image sensor for imaging the position-coding pattern during entering of said handwritten information;

a processor for generating digital ink using the imaged position-coding pattern, said digital ink representing the handwritten information and the unique cheque identity; and means for communicating the digital ink to a computer system, thereby enabling the computer system to generate first payment information based on the digital ink and compare said first payment information with second payment information during the clearing process, said second payment information being based on independently reading at least visible information on said cheque.

19. The system of claim 18, wherein said computer system comprises a first computer system for interpreting the digital ink and generating the first payment information, and a second computer system for comparing the first payment information with the second payment information, said first computer system being in communication with said second computer system.

* * * * *